P. FARWELL.
CLUTCH.
APPLICATION FILED MAR. 31, 1911.
1,080,817.
Patented Dec. 9, 1913.
2 SHEETS—SHEET 1.
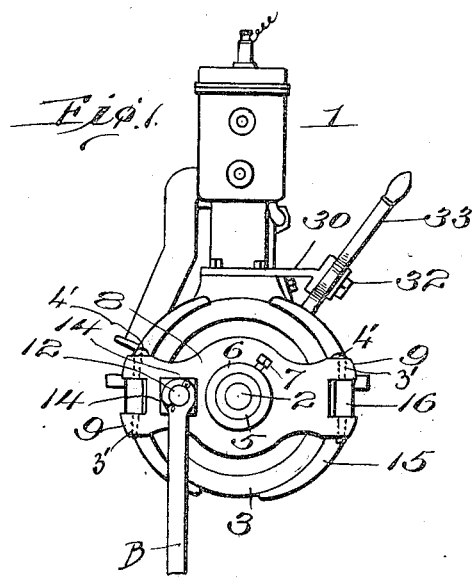
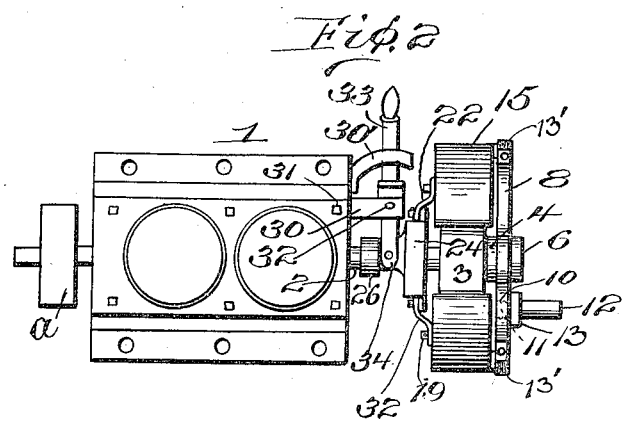
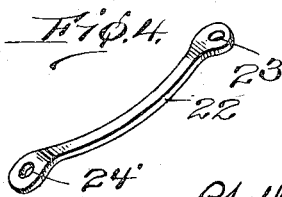

P. FARWELL.
CLUTCH.
APPLICATION FILED MAR. 31, 1911.
1,080,817.
Patented Dec. 9, 1913.
2 SHEETS—SHEET 2.
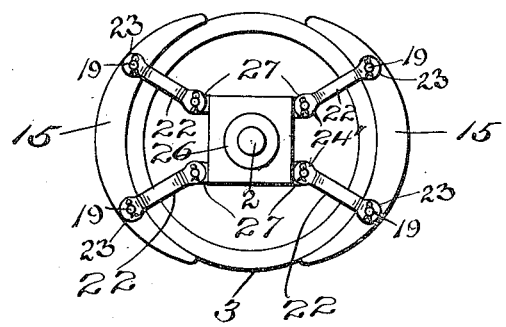
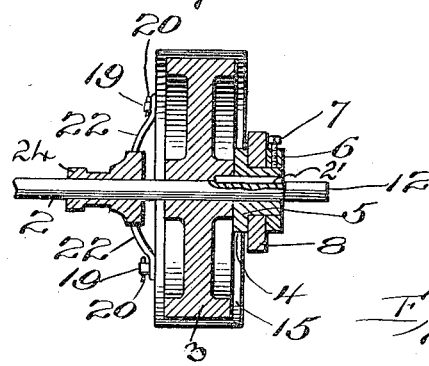
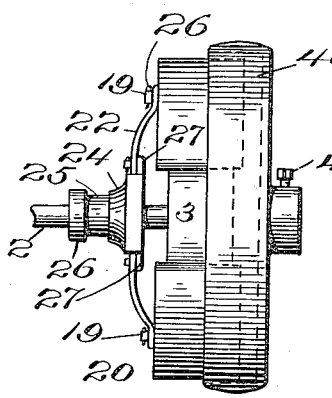
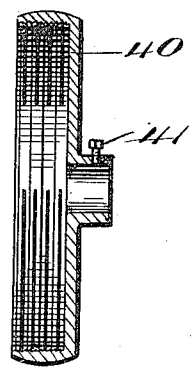
Witnesses
J. M. Fowler Jr.
A. B. Farnham.
Inventor
Phillip Farwell
Geo. W. Sues.
Attorney
By

UNITED STATES PATENT OFFICE.

PHILLIP FARWELL, OF SUNAPEE, NEW HAMPSHIRE.

CLUTCH.

1,080,817. Specification of Letters Patent. Patented Dec. 9, 1913.

Application filed March 31, 1911. Serial No. 618,091.

*To all whom it may concern:*

Be it known that I, PHILLIP FARWELL, a citizen of the United States, and a resident of Sunapee, in the county of Sullivan and State of New Hampshire, have invented certain new and useful Improvements in Clutches, of which the following is a specification, reference being had to the accompanying drawings.

This invention relates to certain new and useful improvements in clutches.

The primary object of my invention is to provide an attachment arranged to be secured to the driving shaft of an engine whereby a working pitman may be actuated.

In the accompanying drawings forming a part of this specification, and in which like numerals of reference indicate similar parts in the several views: Figure 1, shows a view disclosing my device as secured to the fly wheel of an engine, a fragmentary part of the engine being shown. Fig. 2, shows an enlarged view from above showing the clutch, shaft and fly wheel. Fig. 3, shows an inner face view of the clutch mechanism. Fig. 4, shows a detached detail of one of the bowed coupling rods. Fig. 5, shows a modification in which the carrier is shown as giving support to an auxiliary pulley. Fig. 6, is a sectional detail of the auxiliary pulley, arranged to be secured to the carrier plate, and Fig. 7, shows a central sectional view through the clutch and pulley.

A great many engines are at present used by farmers and others in driving such machines as pumps, feed grinders, dairy machinery, circular saws and like machines. As usually constructed both gas and steam engines have a driving shaft, carrying a fly wheel and a belt pulley. A belt is used to operatively connect the engine to the driven machine. There are, however, certain classes of machines such as a drag saw and pumps for instance, which are actuated by means of a reciprocating bar or pitman. To operate a drag saw by means of a belt driven pulley requires an expensive intermedium, such as an extra shaft, boxes and pulleys, and in my present invention I provide a simple device arranged to be attached to the driving shaft of an engine in a manner permitting the same to engage the fly wheel and be rotated thereby to actuate a pitman. While disconnected, the device forms an idler in no way interfering with the operation of the engine.

In the accompanying drawings the numeral 1, designates an engine of any type having a driving shaft 2, carrying at one end a fly wheel 3. The opposite end of this shaft 2, is provided with a belt pulley $a$, as is usual.

Secured to the driving shaft 2, is a sleeve 5, having a stop flange 4. This sleeve 5, where the fly wheel 3, is secured to the shaft by means of a spline, is provided with a slot 2' so as to accommodate the spline 1', shown in Fig. 7. As disclosed, the sleeve is secured to the outer or projecting end of the shaft and adjacent to the outer face of the fly wheel.

Secured adjustably to the sleeve 5, by means of a set screw 7, is a stop collar 6, and revolubly held upon the sleeve 5, and working between the stop collar 6, and the flange 4, is a carrier plate 8, which has its ends apertured to provide the spaced ears 9, which are traversed by suitable openings 3'. This carrier plate at a suitable point is provided with a threaded opening 10, shown in dotted lines in Fig. 2, arranged to receive the screw stem 11, of the wrist pin 12, the wrist pin having the shoulder 13, of a thickness approximately that of the stop collar 6. The end of the wrist pin 12, is provided with a pin opening to receive the cotter pin 14, shown in Fig. 1, so that a pitman B may be properly secured to this wrist pin.

Pivotally held to the ears 9, are two similar friction shoes 15, each having an apertured lug 16, shown in Fig. 1, arranged to be held between the ears 9, a suitable bolt 4' passing through the ears and lugs to pivotally secure the friction shoes to the carrier plates. Each friction shoe upon its inner end is provided with two outstanding studs 19, each having a pin opening arranged to receive a cotter pin 20. Pivotally held upon each stud 19, is one end of a resilient coupling rod 22, which at one end has an eye 23, and at the opposite end an eye 24'. These coupling rods are slightly bowed as shown in Fig. 4, so that they will elongate under stress.

Loosely held upon the driving shaft adjacent to the fly wheel 3, and against the inner face, is a shifting collar 26, having a groove 25, shown in Fig. 5, and ending in a head 24, from which extend four similar ears 27, each ear having a bolt opening. This shifting collar 26, is revolubly and slidably held to the shaft. The four coupling rods 22, extend from the studs 19, which receive the eyes 23, to the ears 27, which receive the eyes 24', the coupling rods being secured to the two members by means of suitable cotter pins.

Secured to a suitable part of the engine 1, is a supporting bracket 30, which gives support to a pin 32, and this pin in turn pivotally supports the shifting lever 33, which at its end has a fork 34, arranged to seat within the groove 25, of the shifting collar.

The coupling rods 22, are of such a length that when the shifting collar 26, is thrown outward against the inner face of the hub of the fly wheel, the coupling rods will force the friction shoes outward and hold them free of the fly wheel. Now if it is at any time desired to bring the wrist pin 12, into action while the fly wheel 3, is rotating, the operator throws the lever 33, to carry the shifting collar outward, resulting in the resilient coupling rods drawing the shoes downward so that they come into engagement with the peripheral edge of the fly wheel resulting in the carrier 8, rotating with the fly wheel. The bracket 30 has a notched sector 30' engaged by a pawl operated by the trip 8', so that the operating lever 33, can be adjustably held and secured. By means of the bowed coupling rods, an equal or balanced engagement of the friction shoes with the fly wheel is insured, for the reason that should the adjustment of the rods be a little unequal, the inequality in the length of the coupling rods will be taken up or compensated in that the short rods will lengthen, this being possible because of their bowed shape. So also by means of these curved rods is a more elastic contact insured and there will be less likelihood of the shoes contacting with the fly wheel with a jar than where solid unyielding rods are used. Further in holding the shifting collar revolubly to the shaft, should the pitman or the machine the same is working, be suddenly stopped or checked the revolubly held collar and resilient coupling rods will permit the carrier to stop momentarily without any injury to the operating effects.

As shown at 13' in Fig. 2, the outer edges of the ears 9, are screw threaded so that should it at any time be desirable to have a second belt driven pulley in connection with the engine, a shell pulley 40, shown in Fig. 6, may be screwed upon the carrier. A set screw 41, is used to hold the shell pulley 40, to the sleeve 5.

It is often desirable to use an engine to work two light pieces of machinery as where a churn and a fanning mill are used. In providing the fly wheel with a driving pulley, an inexpensive device is offered whereby the machine will simultaneously drive two machines without the use of an expensive countershaft. The device is however, especially adapted to be used to operate a pitman which may be connected to a drag saw, pump or other like operated machinery.

The clutch can be readily attached and is both durable and efficient in operation.

Having thus described my said invention, what I claim as new and desire to secure by United States Letters Patent is:—

1. In combination, an engine shaft having a fly wheel secured thereto, a sleeve fixed to the outer end of said shaft with a stop flange held against said wheel, a collar upon said sleeve, a carrier plate revolubly held upon said sleeve between said flange and collar with spaced ears at opposite ends projecting beyond said wheel, two friction shoes for coaction with said wheel each having a lug, each of said lugs held between two of said ears, means to hold said lugs to said ears, a stud extending from each of said shoes, a shifting collar revoluble upon said shaft opposite said sleeve having ears, a pivotally held lever engaging said sleeve, and two curved resilient bars each connected at one end to a friction shoe stud and at the other to a sleeve ear.

2. In combination, an engine shaft having a flywheel secured thereon, a sleeve fixed to the outer end of said shaft with a stop flange held against said wheel, a collar upon said sleeve, a carrier plate revolubly held upon said sleeve between said flange and collar with spaced ears at opposite ends projecting beyond said wheel, two friction shoes for coaction with said wheel each having an apertured lug each of said lugs held between two of said ears, pins to hold said lugs to said ears, a stud extending from each of said shoes, a shifting collar revoluble upon said shaft opposite said sleeve having ears, a pivotally held lever engaging said sleeve, and two curved resilient bars each connected at one end to a friction shoe stud and at the other to a sleeve ear.

In testimony whereof I affix my signature, in presence of two witnesses.

PHILLIP FARWELL.

Witnesses:
 CARRIE B. CORLISS,
 ETHEL M. CORLISS.